US007685431B1

(12) United States Patent
Mullany

(10) Patent No.: US 7,685,431 B1
(45) Date of Patent: Mar. 23, 2010

(54) SYSTEM AND METHOD FOR DETERMINING RELATIVE STRENGTH AND CRACKABILITY OF A USER'S SECURITY PASSWORD IN REAL TIME

(75) Inventor: Michael Mullany, Palo Alto, CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/528,845

(22) Filed: Mar. 20, 2000

(51) Int. Cl.
*G06F 21/00* (2006.01)
(52) U.S. Cl. ............... 713/184; 713/182; 713/183; 726/6
(58) Field of Classification Search ............ 713/183, 713/184, 202
See application file for complete search history.

(56) References Cited

U.S. PATENT DOCUMENTS

| | | | | |
|---|---|---|---|---|
| 5,394,471 A * | 2/1995 | Ganesan et al. | ............ | 713/183 |
| 5,581,700 A * | 12/1996 | Witte | ............ | 713/202 |
| 5,727,156 A | 3/1998 | Herr-Hoyman et al. | ..... | 709/219 |
| 5,790,793 A | 8/1998 | Higley | ............ | 709/218 |
| 5,799,285 A | 8/1998 | Klingman | ............ | 705/26 |
| 5,870,559 A | 2/1999 | Leshem et al. | ............ | 709/224 |
| 5,870,767 A | 2/1999 | Kraft, IV | ............ | 707/501.1 |
| 5,893,127 A | 4/1999 | Tyan et al. | ............ | 707/513 |
| 5,905,248 A | 5/1999 | Russell et al. | ......... | 235/462.15 |
| 5,913,215 A | 6/1999 | Rubinstein et al. | ............ | 707/10 |
| 6,145,086 A * | 11/2000 | Bellemore et al. | ......... | 713/202 |
| 6,625,567 B1 * | 9/2003 | McMahan | ............ | 702/179 |
| 6,643,784 B1 * | 11/2003 | McCulligh | ............ | 713/202 |
| 6,687,823 B1 * | 2/2004 | Al-Salqan et al. | ............ | 713/167 |

OTHER PUBLICATIONS

Muffett, Alec; "CrackLib: A ProActive Password Sanity Library"; Dec. 14, 1997; pp. 1-5.*

Flanagan, David; JavaScript The Definitive Guide; Jun. 1998; O'Reilly; 3rd Edition; pp. 1-23, 284-314, 536-537.*

Muffett, Alec; "Crack Version 4.1: A Sensible Password Checker for Unix"; Mar. 3, 1992; pp. 1-13.*

Bishop, "Proactive Password Checking", Aug. 1992, 4th Workshop on Computer Security Incident Handling, pp. 1-9.*

Bishop et al., "Improving system security via proactive password checking", Computers and Security, pp. 1-16, Apr. 1995.*

Morris et al. "Password Security: A Case History"; Nov. 1979, Communications of the ACM, vol. 22, Issue 11, pp. 594-597.*

Yan, A Note on Proactive Password Checking, Proceedings of the 2001 Workshop on New Security Paradigms, 2001.*

Proctor et al., Improving computer security for authentication of users: Influence of proactive password restrictions, Behavior Research Methods, Instruments, & Computers, 2002.*

Spafford, OPUS: Preventing Weak Password Choices, Purdue Technical Report CSD-TR 92-028, Jun. 1991.*

Morris et al., Password Security: A Case History, Communications of the ACM, Nov. 1979.*

WebTracker: 7 Password Strength Scripts, downloaded from http://webtecker.com/2008/03/26/collection-of-password-strength-scripts/ on Oct. 4, 2009.*

(Continued)

*Primary Examiner*—Jung Kim
(74) *Attorney, Agent, or Firm*—Fish & Richardson P.C.

(57) ABSTRACT

System and method for determining crackability of a password in real time. The system and method include and involve a server system that serves a software package, and a client system that is coupled to the server system. The client system is configured to receive the software package. The software package includes a password entry facility permitting a user to enter a password candidate string one character at a time, and a strength determination facility configured to communicate with the password entry facility and to determine the crackability of the password candidate in real time repeatedly as each character of the password candidate string is entered into the password entry facility.

27 Claims, 3 Drawing Sheets

OTHER PUBLICATIONS

Figure 1:
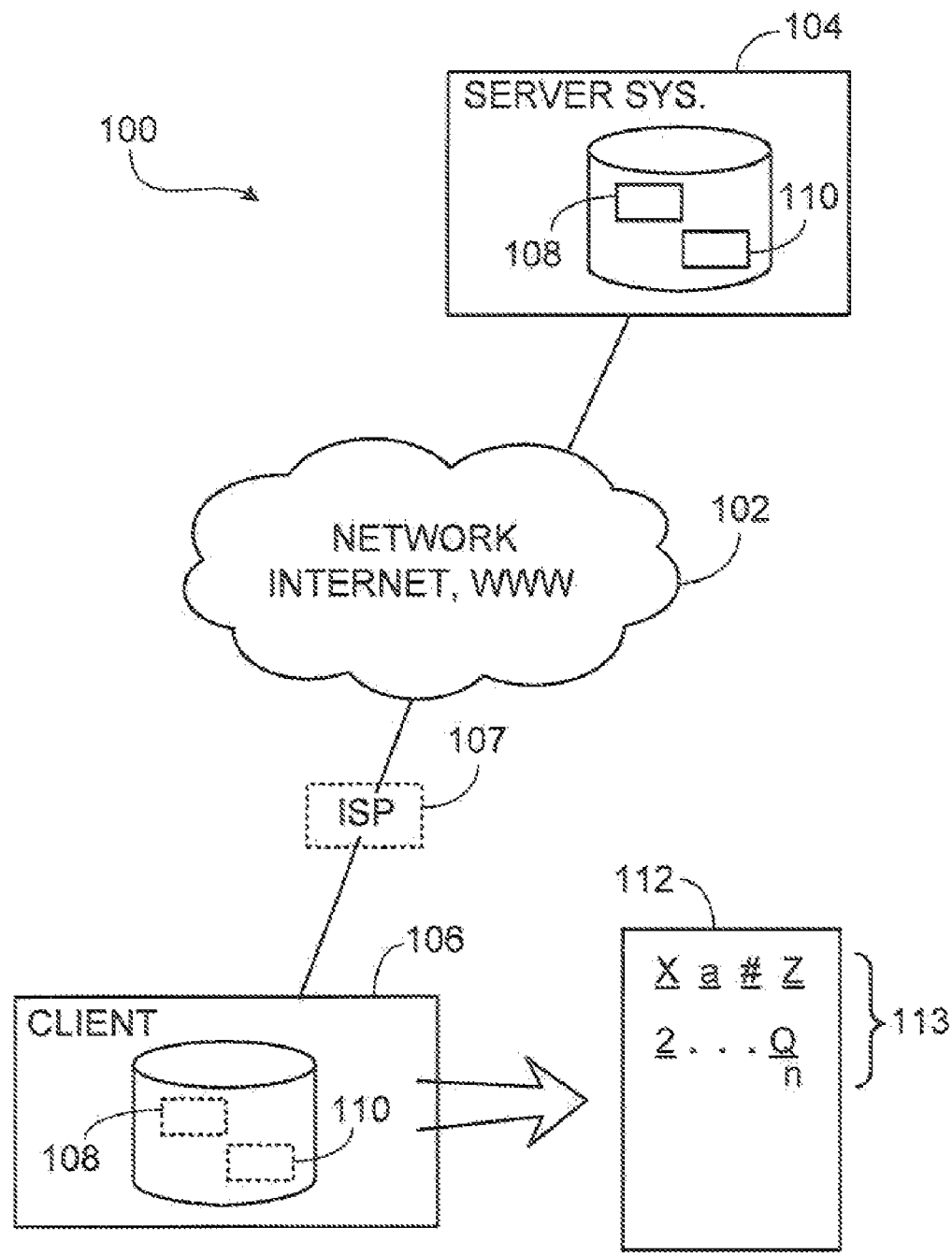

Yahoo! Registration, downloaded from https://edit.yahoo.com/registration?.src=fp&.intl=us&.done=http://m.www.yahoo.com/ on Oct. 4, 2009, including a portion of the source code (pgs. ) related to the password check facility.*

Create a Google Account—Gmail, downloaded from https://www.google.com/accounts/NewAccount?service=mail&continue=http%3A%2F%2Fmail.google.com%2Fmail%2Fe-11-116991ef5b2841d0f3ee1b380f163dc5-2be3d79f2dcc14f1b5b5ef48e17d5b8 ddb0c996e&type=2 on Oct. 4, 2009, including a portion of the source code (pp. 15-19) related to the password check facility.*

* cited by examiner

SYSTEM AND METHOD FOR DETERMINING RELATIVE STRENGTH AND CRACKABILITY OF A USER'S SECURITY PASSWORD IN REAL TIME

BACKGROUND OF THE INVENTION

1. Field of the Invention

The present invention relates to systems and methods used to permit a user of a computing and data processing system to set a password that is used to limit access to the user's data stored within the computing and data processing system.

2. Description of the Related Art

User identification codes and passwords are well known. Our society uses passwords such as alpha numeric strings of characters (e.g., "COAT," "9821," "WAYCOOL4," etc.) for many purposes such as to obtain cash from cash machines, to access computer and data processing system accounts (e.g., online accounts) where personal data is stored, and, generally, to provide a level of security to protect one's personal information from unwanted eyes.

Unfortunately, users of data processing and online systems often set passwords that are poor security guards. That is, users often pick passwords that are easy to "crack," or be determined by others. When a password is easy to crack, a data thief may obtain access to systems and personal information, which can be wrongfully used. For example, some Internet and World Wide Web sites now permit users to pre-configure their online profiles to include credit card numbers and the like. If a user of such an online system were to select a password that is easily cracked, the user's credit card number could be stolen and wrongfully charged. In such cases, consumers and product and service providers suffer losses.

To address the problems associated with setting passwords, providers such as online providers have proposed various solutions. For example, some providers (e.g., WWW site operators, etc.) have addressed such problems administratively by implementing password establishment rules such as those associated with minimum length strings, upper and lower case character requirements, etc. Such solutions still do not prevent users from selecting and setting passwords containing strings of characters (alpha numeric strings) that may be easily cracked (e.g., the password "Usgovernment"). As such, rules based solutions do not allow a user to make a decision as to the relative strength of particular password candidate; instead, such rules based solutions require users to engage in brute force selection of passwords until one is selected that meets the particular rules in effect.

Another solution that has been proposed is to run a password cracking program against a submitted password candidate for a relatively short period of time to determine if the password can be easily cracked. Unfortunately, such programs are often time consuming to run, are subject to limited algorithms for determining "crackability" (i.e., a password's susceptibility to being determined by unwanted eyes) and are not run in real time. As such, users often must wait for a determination to be made prior to accessing a system (e.g., an online system, etc.).

Thus, there exists a need to provide new and improved systems and methods to solve the aforementioned problems associated with selecting and setting passwords such as those that may be used with online systems and services (e.g., WWW services, etc.). To be viable, such systems and methods must permit a user to select a password in real time and learn of its relative strength (e.g., its crackability) prior to actually setting the password.

SUMMARY OF THE INVENTION

The present invention solves the aforementioned problems associated with prior systems and methods used to facilitate user password/ID selection. Providers will benefit from the present invention by being able to offer services such as those provided by network sites (e.g., Internet and World Wide Web (WWW) sites) that permit users to set passwords and other similar IDs with knowledge about the security of such passwords. And, because the present invention permits password security to be evaluated and determined in real time, users will be better able to control and protect their privacy.

The present invention achieves its objectives to deliver the aforementioned benefits by providing new and improved systems and methods for determining crackability of a password in real time. Crackability refers to the ability of password to be determined or revealed using brute force techniques performed, for example, by a computer that repetitively and exhaustively checks each string combination as an attack against a subject password. Such systems and methods include and involve a server system that serves a software package, and a client system that is coupled to the server system. The client system is configured to receive the software package. The software package includes a password entry facility permitting a user to enter a password candidate string one character at a time, and a strength determination facility configured to communicate with the password entry facility and to determine the crackability of the password candidate in real time repeatedly as each character of the password candidate string is entered into the password entry facility.

The present invention is next described with reference to the drawing figures attached to this patent document.

BRIEF DESCRIPTION OF THE DRAWING FIGURES

Figure 2:
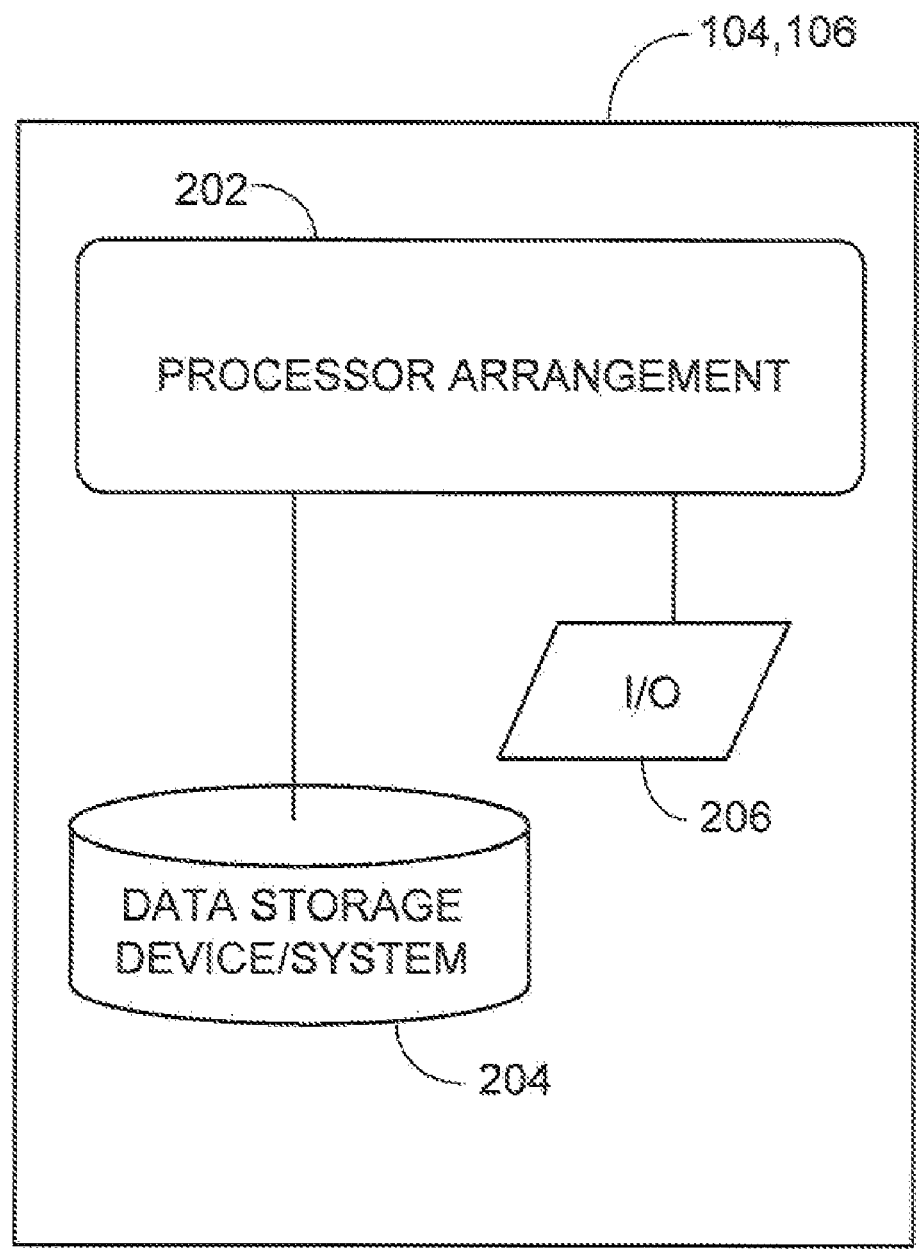
Figure 3:
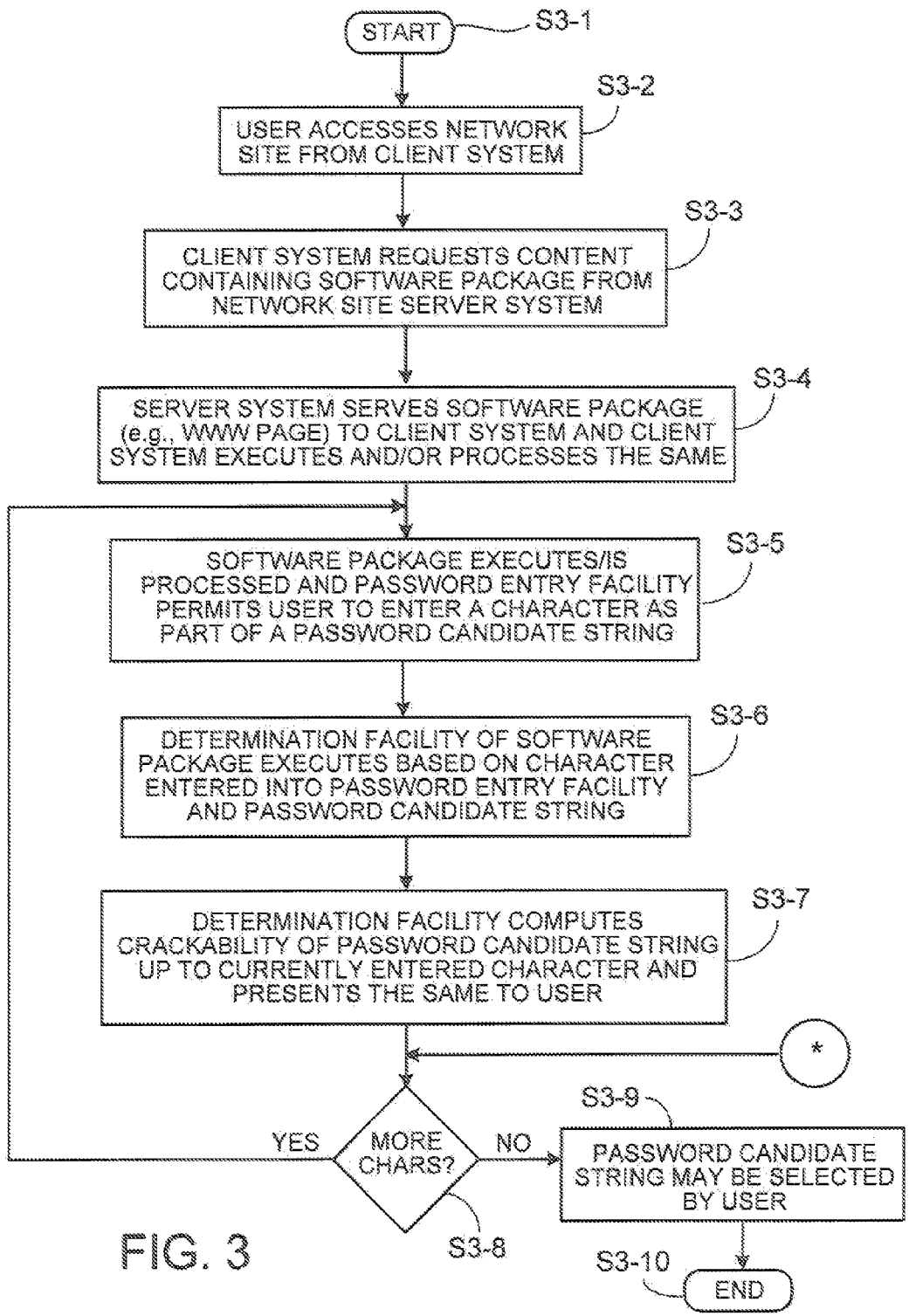

The present invention is described in detail below with regard to the attached drawing figures, of which:

FIG. 1 is a diagram of a system in which facilities are utilized to determine the relative strength and crackability of a user's security password in real time in accordance with a preferred embodiment of the present invention;

FIG. 2 is a block diagram of an automatic data processing system that may be configured in accordance with a preferred embodiment of the present invention to serve and/or receive a software package that facilitates determination of the relative strength of a user's security password in real time; and FIG. 3 is a flowchart that illustrates a process for determining the relative strength and crackability of a user's security password in real time in accordance with a preferred embodiment of the present invention.

DETAILED DESCRIPTION OF THE PREFERRED EMBODIMENTS

The present invention is now discussed with reference to the drawing figures that were briefly described above. Unless otherwise specified, like parts and processes are referred to with like reference numerals.

In the discussions that follow, the terms:

"Crackability" refers to a password's relative strength. That is, crackability is a measure of a password's ability to remain undetermined by unwanted parties. In the context of the present invention, crackability may be a predicted amount or measure of time (referred to herein as a "time-to-crack" parameter) for a password to be cracked or determined by unwanted eyes.

"Password" refers to any type of personal identifier that may be used to provide a system user with a verifiable security shield. Accordingly, in the discussions that follow, the use of the term "password" is intended to include all types of identifiers such as user IDs, passwords, security words, etc. There is no requirement that the present invention only apply to passwords as that term has been used in prior contexts.

"Brute force" refers to processes, which may be used to check combinations and permutations (such as all such combinations or permutations) of characters in a string, for example, against a particular password to determine if a match exists. When such a match occurs, a brute force process is said to produce a usable password and, in particular, one that may be used, for example, to obtain access (e.g., wrongful access, etc.) to a corresponding user's personal information and data. An estimated amount of time that such a brute force process may take to derive a valid password can be thought of as the aforementioned crackability or "time-to-crack" parameter or factor —i.e., a predicted measure or amount of time it would take to crack a particular password. In the context of the present invention, time-to-crack is predicted based on a factor of 40,000 attacks per second. That is, a password candidate such as "r*D8mYI^nch" would take over one (1) year to crack or determine if a data processing system were configured to automatically engage in a brute force cracking operation that permitted at least 40,000 attacks or password combination checks per second. Such a number of attacks are quite significant based on modern data processing systems.

The aforementioned terms may be pluralized in the discussions that follow. Such pluralized terms are not intended to change the underlying meanings presented above.

Structural Aspects of the Present Invention

Referring now to FIG. 1, depicted therein is a diagram of a system in which facilities are utilized to determine the relative strength and crackability of a user's security password in real time in accordance with the preferred embodiment of the present invention. In particular, system 100 includes a network such as the Internet and World Wide Web 102, a server system 104, a client system 106, and, possibly, an Internet or other similar network service provider ISP 107. Within server system 104, are facilities 108 and 110, which are configured to be executed within a data processing system to permit entry of character strings, and determination of crackability factors in accordance with the present invention. Facilities 108 and 110 may be implemented using computer software and programming logic and may be configured to be transmitted or served via a network connection established between client system 106 and server system 104. Facilities 108 and 110 are discussed in detail below with regard to FIG. 3. Such network connections will be readily understood by those skilled in the art. It should be noted that client system 106 may be configured to access a network such as the Internet and, ultimately, server system 104 via an Internet service provider such as ISP 107.

Once facilities 108 and 110 are properly executed within client system 106, for example, content received from server system 104 may be manifested in the context of a web site page view 112. Web site page view 112 may include a form mechanism or other data entry facility to permit a user to enter character sequences such as those used with passwords in accordance with the preferred embodiment of the present invention. More particularly, the present invention permits a user to enter any length character string as illustrated in web site page view 112 containing end number of characters in a password candidate string 114. More particularly, password candidate string 113 may include alphanumeric characters as well as symbols, which may be included within a character set, such as the ASCII character set. For example, password candidate string 113 may appear like or similar to "xB3$*-^Y"; such a string could take a relatively long time to crack.

Referring now to FIG. 2, depicted therein is a block diagram of a data processing system that may be used in implementing server system 104 and/or client system 106 in accordance a preferred embodiment of the present invention. In particular, server and client systems 104 and 106 include a processor arrangement 202 including one or more central processing units, a data storage facility 204, and input and output facilities 206. Data storage facility 204 is configured to store and provide facilities 108 and 110 to processor arrangement 202 for proper execution thereby. I/O facilities 206 are configured to permit network I/O among other types of multimedia input and output.

Operational Aspects of the Present Invention

The structures show in FIGS. 1 and 2 and the structural aspects discussed in regard thereto, are designed and configured to operate together to provide the functionality provided by the present invention. Such functionality is illustrated by the operations and processes shown in FIG. 3, to which reference is now made.

Referring now to FIG. 3, depicted therein is a flowchart that illustrates operations and processes for determining the relative strength and crackability of a user security password candidate in real time in accordance with a preferred embodiment of the present invention. In particular, processing and operations start step S3-1 and immediately proceed to step S3-2. At step S3-2, a user accesses a network site from a client system such as client system 106. The network site may be provided by a server system such as server system 104.

Next, at step S3-3 a client system 106 requests content containing a software package from the network site (server system 104). Such network and WWW downloading will be immediately understood by those skilled in the art.

Next, at step S3-4, server system 104 serves the software package to the client system 106 and the client system processes and executes the same (e.g., performs Hyper-Text Markup Language (HTML) rendering and script processing, etc.).

Next, at step S3-5, the software package executes within client system 106 and a password entry facility such as password entry facility 108 permits a user to enter at least one character as part of a password candidate string.

Next, at step S3-6, a determination facility, such as determination facility 110 (FIG. 1) within the downloaded software package executes within client system 106, for example, based on the characters entered to the password entry facility during step S3-5. Determination facility 110 may be configured to operate repetitively for each character entered by the user to achieve real time processing. Alternatively, determination facility 110 may be configured to operate in batch fashion whereby an entire password candidate string or at least portions thereof may be processed.

Next, at step S3-7, determination facility 110 computes crackability of the password candidate string (e.g., for the characters currently entered by the user) and presents the results of such evaluation to the user. The determination of crackability in accordance with the present invention is to determine a measure of time that a brute force attack technique would take to derive the password candidate string entered by the user.

According to a preferred embodiment of the present invention, password candidates may contain the upper and lower case characters, numbers, and symbols that make up a character set, such as the ASCII character set. As such, computing crackability and, in particular, the number of potential combinations that potentially could be evaluated by a brute force attack, contemplates an exponential number of combinations based on the unique number of characters that can comprise a particular password candidate. For example, if only lower case letters are entered by a user, combinations are computed based on a core number of 26—the number of possible characters that each character in a password candidate may be. If upper and lower case characters are used, then combinations are calculated based on a core number of 52, and so on, up to the total number of unique characters in a particular character set such as the ASCII character set.

Determination of crackability by determination facility 110 preferably is carried out as a program task that operates to produce a prediction as to the relative strength or difficulty associated with determining a user's valid password. Such a program task may be implemented using a computer and programming logic. For example, a JavaScript may be used to implement determination facility 110, which is intended to run as loadable software in a general purpose data processing system. Alternatively, since the present invention is widely applicable in many contexts that often utilize special purpose computers (e.g., ATM Banking Machines, etc.) determination facility 110 may be placed in a permanent storage device such as a read only memory device (ROM) or other similar non-volatile memory.

A preferred embodiment of determination facility 110 has been implemented using JavaScript and is intended to form part of a WWW site HTML page. Such a script also includes a data entry facility that may be used to implement facility 108 (password character/string entry facilities). Such a script is listed below by way of example within the HTML listing that follows to aid the reader in understanding the present invention. Those skilled in the art will immediately understand the listing that follows.

```
</html>
<meta http-equiv="Content-Type" content="text/html;
  charset=iso-8859-1">
<meta name="Author" content="Michael Mullany">
<meta name="GENERATOR" content="Mozilla/4.5 [en] (WinNT; U)
  [Netscape]">
    <title>PWSecurity</title>
<!-- javascript is copyright Netscape Communications Corp. 1999 © -->
<script>
function checkPW(form) {
    repeat= new Array(255)
    for(i= 0; i<255; i++) {repeat [i] =0;}
    var isupper=0;
    var islower=0;
    var isnumer=0;
    var isnonalphanumer=0;
    var charrepeat=0;
    var charnum;
    var wordlength=form.PW1.value.length;
    for(i=0; i<wordlength; i++)
    {
    charnum=form.PW1.value.charCodeAt (i);
    if (repeat [charnum] ==0) {repeat [charnum] ++;}
        else {charrepeat++;}
    if(charnum>47 && charnum<58)
```

-continued

```
    {
    isnumer=1;
    }else{
        if(charnum>64 && charnum<91)
        {
        isupper=1;
            }else{
            if(charnum>96 && charnuma<123)
            {
            islower=1;
            }else{isnonalphanumer=1};
            }
        }
    }
    var charspace=(10*isnumer+26*isupper+26*islower+33*
      isnonalphanumer);
    var wordspace=Math.pow(charspace, wordlength-charrepeat);
    x=Math.min(1, ((Math.log(wordspace)/Math.log(2))/66));
    this.document.layers[0].clip.top=126-(126*x);
}
</script>
</head>
<body>
<center><table BORDER COLS=1 WIDTM="45%" BGCOLOR=
"#FFFFFF"  >
<tr ALIGN=CENTER VALIGN=CENTER BGCOLOR="#FFFFCC">
<td><b><font face="Verdana"><font size=+1>Choose a New Password
</font></font></b>
<br> 
<table>
<tr VALIGN=TOP>
<td>
<center><table HEIGHT="100%" >
<tr>
<td HEIGHT="42"><b><font face="Verdana"><font size=-1>Good
</font></font></b></td>
<td ROWSPAN="3" HEIGHT="100%">
<table BORDER CELLSPACING=0 CELLPADDING=0 >
<tr>
<td><ilayer clip="0,126,26,126"><img SRC="pwstrength.JPG"
BORDER=0 height=126 width=25></ilayer></td>
</tr>
</table>
</td>
</tr>
<tr>
<td HEIGHT="42"><b><font face="Verdana"><font size=-1>
Better</font></font></b></td>
</tr>
<tr>
<td HEIGHT="42"><b><font face="Verdana"><font size=-1>
Weak</font></font></b></td>
</tr>
</table></center>
</td>
<td>
<center><table HEIGHT="100%" >
<tr>
<td HEIGHT="42"><form name="myform"><font face="Verdana">
<font size=-1>Username</font></font></td>
<td><input type="text" name="UID" width="30"></td>
</tr>
<tr>
<td HEIGHT="42"><font face="Verdana"><font size=-1>Password
</font></font></td>
<td><input type="password" name="PW1" width="30" onKeyUp=
"checkPw(myform)"></td>
</tr>
<tr>
<td HEIGHT="42"><font face="Verdana"><font size=-1>
Password(again)</font></font></td>
<td><input type="password" name="PW2" width="30"></form></td>
</tr>
</table></center>
</td>
</tr>
</table>
</td>
</tr>
```

-continued

```
<tr><td>
<BR>
<font face="Verdana" size=-2>
This quality meter provides a measure of the total time to crack a
password.
<OL>
<LI>"Green" passwords take over a year to crack. (e.g. r*D8mY1^nch)
<LI>"Red" passwords can be cracked in seconds. (e.g.monty)
</OL>
However, no matter what the meter says, if your password includes a word
that can be found in the dictionary of ANY language (even Pig Latin!)
OR includes the name of a person, place or thing in ANY language, then
your password can probably be cracked in minutes.
</font>
<BR>

</table></center>
<br> 
</body>
</html>
```

Next, at step S3-8, a determination is made to whether the user intends to enter more characters into his password candidate string. If so, processing proceeds back to step S3-5 as discussed above to create a looping construct. If not, processing proceeds to step S3-9.

At step S3-9, the password candidate string maybe selected by the user for subsequent security purposes.

Next, processing ends at step S3-10.

Within FIG. 3 an asterisk is encircled as is found above step S3-8 to indicate that additional operations maybe included within the processes and operations illustrated in the flowchart shown in FIG. 3. There is no requirement, however, that such additional operations be placed in any particular spot within the process illustrated in FIG. 3. For example, additional operations may be included to restrict the user in his selection of particular passwords. That is, the present invention contemplates the inclusion of processes to restrict the user's selection of a password to one that would require a brute force technique to spend a particular amount of time (e.g., five hours, one or more years, etc.) to derive the user's password. Accordingly, such additional operations would be suited to governmental and military applications where users would be prompted to enter passwords that would be difficult to discern based on application-specific password cracking standards.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A method of evaluating a potential password comprising:
   accessing a potential password for a user having multiple characters;
   identifying, from among at least a numeric character type, a lowercase letter character type, an uppercase letter character type, and a nonalphanumeric character type, character types that correspond to the multiple characters included in the potential password;
   detecting variations in the identified character types that correspond to the multiple characters included in the potential password by:
      detecting whether the potential password includes at least one numeric character,
      detecting whether the potential password includes at least one lowercase letter character,
      detecting whether the potential password includes at least one uppercase letter character, and
      detecting whether the potential password includes at least one nonalphanumeric character;
   determining a total number of the multiple characters included in the potential password;
   determining a number of repeated characters included in the multiple characters included in the potential password;
   computing a measure that reflects the number of repeated characters relative to the total number of the multiple characters included in the potential password;
   computing, by at least one computer and based on the detected variations in the identified character types and the computed measure that reflects the number of repeated characters relative to the total number of the multiple characters included in the potential password, a numeric value that corresponds to an amount of time estimated for cracking the potential password by:
      modifying the numeric value in a manner that increases an amount of time estimated for cracking the potential password conditioned on detecting that the potential password includes at least one numeric character,
      modifying the numeric value in a manner that increases an amount of time estimated for cracking the potential password conditioned on detecting that the potential password includes at least one lowercase letter character,
      modifying the numeric value in a manner that increases an amount of time estimated for cracking the potential password conditioned on detecting that the potential password includes at least one uppercase letter character,
      modifying the numeric value in a manner that increases an amount of time estimated for cracking the potential password conditioned on detecting that the potential password includes at least one nonalphanumeric character, and
      modifying the numeric value as a function of the computed measure that reflects the number of repeated characters relative to the total number of the multiple characters included in the potential password; and
   making perceivable information as an indication of strength for the potential password based on the computed numeric value.

2. The method of claim 1 wherein:
   modifying the numeric value in a manner that increases an amount of time estimated for cracking the potential password conditioned on detecting that the potential password includes at least one numeric character comprises modifying the numeric value using a first weighting factor;
   modifying the numeric value in a manner that increases an amount of time estimated for cracking the potential password conditioned on detecting that the potential password includes at least one lowercase letter character comprises modifying the numeric value using a second weighting factor that is greater than the first weighting factor;
   modifying the numeric value in a manner that increases an amount of time estimated for cracking the potential password conditioned on detecting that the potential password includes at least one uppercase letter character comprises modifying the numeric value using the second weighting factor; and modifying the numeric value in a manner that increases an amount of time estimated for cracking the potential password conditioned on detecting that the potential password includes at least one nonalphanumeric character comprises modifying the numeric value using a third weighting factor that is greater than the first weighting factor and the second weighting factor.

3. The method of claim 1 wherein computing the measure that reflects the number of repeated characters relative to the total number of the multiple characters included in the potential password comprises subtracting the number of repeated characters from the total number of the multiple characters included in the potential password.

4. The method of claim 1 wherein modifying the numeric value as a function of the computed measure that reflects the number of repeated characters relative to the total number of the multiple characters included in the potential password comprises modifying the numeric value based on a calculation that uses the computed measure as an exponent.

5. The method of claim 4 wherein modifying the numeric value based on a calculation that uses the computed measure as an exponent comprises computing a first value based on the detected variations in the identified character types and raising the first value to a power of the computed measure.

6. The method of claim 1 further comprising:
enabling the user to change the potential password;
receiving user input resulting in a modified potential password; and
updating the perceivable information to reflect an indication of strength of the modified potential password.

7. The method of claim 6 further comprising updating the perceivable information to reflect an indication of strength of the modified potential password comprises updating the perceivable indication each time the user enters user input resulting in a modified potential password.

8. The method of claim 1 further comprising conditioning acceptance of the potential password as the user's password upon comparison of a strength of the potential password against a threshold.

9. The method of claim 8 wherein conditioning acceptance of the potential password as the user's password upon comparison of the strength of the potential password against the threshold comprises denying selection of the potential password as the user's password in response to a determination that the strength of the potential password does not exceed the threshold.

10. At least one storage device having stored thereon executable instructions that when executed by at least one computer cause the at least one computer to perform operations comprising:
accessing a potential password for a user having multiple characters;
identifying, from among at least a numeric character type, a lowercase letter character type, an uppercase letter character type, and a nonalphanumeric character type, character types that correspond to the multiple characters included in the potential password;
detecting variations in the identified character types that correspond to the multiple characters included in the potential password by:
detecting whether the potential password includes at least one numeric character,
detecting whether the potential password includes at least one lowercase letter character,
detecting whether the potential password includes at least one uppercase letter character, and
detecting whether the potential password includes at least one nonalphanumeric character;
determining a total number of the multiple characters included in the potential password;
determining a number of repeated characters included in the multiple characters included in the potential password;
computing a measure that reflects the number of repeated characters relative to the total number of the multiple characters included in the potential password;
computing, based on the detected variations in the identified character types and the computed measure that reflects the number of repeated characters relative to the total number of the multiple characters included in the potential password, a numeric value that corresponds to an amount of time estimated for cracking the potential password by:
modifying the numeric value in a manner that increases an amount of time estimated for cracking the potential password conditioned on detecting that the potential password includes at least one numeric character,
modifying the numeric value in a manner that increases an amount of time estimated for cracking the potential password conditioned on detecting that the potential password includes at least one lowercase letter character,
modifying the numeric value in a manner that increases an amount of time estimated for cracking the potential password conditioned on detecting that the potential password includes at least one uppercase letter character,
modifying the numeric value in a manner that increases an amount of time estimated for cracking the potential password conditioned on detecting that the potential password includes at least one nonalphanumeric character, and
modifying the numeric value as a function of the computed measure that reflects the number of repeated characters relative to the total number of the multiple characters included in the potential password; and
making perceivable information as an indication of strength for the potential password based on the computed numeric value.

11. The at least one storage device of claim 10 wherein:
modifying the numeric value in a manner that increases an amount of time estimated for cracking the potential password conditioned on detecting that the potential password includes at least one numeric character comprises modifying the numeric value using a first weighting factor;
modifying the numeric value in a manner that increases an amount of time estimated for cracking the potential password conditioned on detecting that the potential password includes at least one lowercase letter character comprises modifying the numeric value using a second weighting factor that is greater than the first weighting factor;
modifying the numeric value in a manner that increases an amount of time estimated for cracking the potential password conditioned on detecting that the potential password includes at least one uppercase letter character comprises modifying the numeric value using the second weighting factor; and
modifying the numeric value in a manner that increases an amount of time estimated for cracking the potential password conditioned on detecting that the potential password includes at least one nonalphanumeric character comprises modifying the numeric value using a third weighting factor that is greater than the first weighting factor and the second weighting factor.

12. The at least one storage device of claim 10 wherein computing the measure that reflects the number of repeated characters relative to the total number of the multiple characters included in the potential password comprises subtracting the number of repeated characters from the total number of the multiple characters included in the potential password.

13. The at least one storage device of claim 10 wherein modifying the numeric value as a function of the computed measure that reflects the number of repeated characters relative to the total number of the multiple characters included in the potential password comprises modifying the numeric value based on a calculation that uses the computed measure as an exponent.

14. The at least one storage device of claim 13 wherein modifying the numeric value based on a calculation that uses the computed measure as an exponent comprises computing a first value based on the detected variations in the identified character types and raising the first value to a power of the computed measure.

15. The at least one storage device of claim 10 wherein the operations further comprise:
enabling the user to change the potential password;
receiving user input resulting in a modified potential password; and
updating the perceivable information to reflect an indication of strength of the modified potential password.

16. The at least one storage device of claim 15 wherein the operations further comprise updating the perceivable information to reflect an indication of strength of the modified potential password comprises updating the perceivable indication each time the user enters user input resulting in a modified potential password.

17. The at least one storage device of claim 10 wherein the operations further comprise conditioning acceptance of the potential password as the user's password upon comparison of a strength of the potential password against a threshold.

18. The at least one storage device of claim 17 wherein conditioning acceptance of the potential password as the user's password upon comparison of the strength of the potential password against the threshold comprises denying selection of the potential password as the user's password in response to a determination that the strength of the potential password does not exceed the threshold.

19. A data processing system comprising:
at least one processing unit; and
a data storage facility coupled to the at least one processing unit having executable instructions stored thereon which, when executed by the at least one processing unit, cause the at least one processing unit to perform operations comprising:
accessing a potential password for a user having multiple characters;
identifying, from among at least a numeric character type, a lowercase letter character type, an uppercase letter character type, and a nonalphanumeric character type, character types that correspond to the multiple characters included in the potential password;
detecting variations in the identified character types that correspond to the multiple characters included in the potential password by:
detecting whether the potential password includes at least one numeric character,
detecting whether the potential password includes at least one lowercase letter character,
detecting whether the potential password includes at least one uppercase letter character, and
detecting whether the potential password includes at least one nonalphanumeric character;
determining a total number of the multiple characters included in the potential password;
determining a number of repeated characters included in the multiple characters included in the potential password;
computing a measure that reflects the number of repeated characters relative to the total number of the multiple characters included in the potential password;
computing, based on the detected variations in the identified character types and the computed measure that reflects the number of repeated characters relative to the total number of the multiple characters included in the potential password, a numeric value that corresponds to an amount of time estimated for cracking the potential password by:
modifying the numeric value in a manner that increases an amount of time estimated for cracking the potential password conditioned on detecting that the potential password includes at least one numeric character,
modifying the numeric value in a manner that increases an amount of time estimated for cracking the potential password conditioned on detecting that the potential password includes at least one lowercase letter character,
modifying the numeric value in a manner that increases an amount of time estimated for cracking the potential password conditioned on detecting that the potential password includes at least one uppercase letter character,
modifying the numeric value in a manner that increases an amount of time estimated for cracking the potential password conditioned on detecting that the potential password includes at least one nonalphanumeric character, and
modifying the numeric value as a function of the computed measure that reflects the number of repeated characters relative to the total number of the multiple characters included in the potential password; and
making perceivable information as an indication of strength for the potential password based on the computed numeric value.

20. The system of claim 19 wherein:
modifying the numeric value in a manner that increases an amount of time estimated for cracking the potential password conditioned on detecting that the potential password includes at least one numeric character comprises modifying the numeric value using a first weighting factor;
modifying the numeric value in a manner that increases an amount of time estimated for cracking the potential password conditioned on detecting that the potential password includes at least one lowercase letter character comprises modifying the numeric value using a second weighting factor that is greater than the first weighting factor;
modifying the numeric value in a manner that increases an amount of time estimated for cracking the potential password conditioned on detecting that the potential password includes at least one uppercase letter character comprises modifying the numeric value using the second weighting factor; and
modifying the numeric value in a manner that increases an amount of time estimated for cracking the potential password conditioned on detecting that the potential password includes at least one nonalphanumeric character comprises modifying the numeric value using a third weighting factor that is greater than the first weighting factor and the second weighting factor.

21. The system of claim 19 wherein computing the measure that reflects the number of repeated characters relative to the total number of the multiple characters included in the potential password comprises subtracting the number of repeated characters from the total number of the multiple characters included in the potential password.

22. The system of claim 19 wherein modifying the numeric value as a function of the computed measure that reflects the number of repeated characters relative to the total number of the multiple characters included in the potential password comprises modifying the numeric value based on a calculation that uses the computed measure as an exponent.

23. The system of claim 22 wherein modifying the numeric value based on a calculation that uses the computed measure as an exponent comprises computing a first value based on the detected variations in the identified character types and raising the first value to a power of the computed measure.

24. The system of claim 19 wherein the operations further comprise:
    enabling the user to change the potential password;
    receiving user input resulting in a modified potential password; and
    updating the perceivable information to reflect an indication of strength of the modified potential password.

25. The system of claim 24 wherein the operations further comprise updating the perceivable information to reflect an indication of strength of the modified potential password comprises updating the perceivable indication each time the user enters user input resulting in a modified potential password.

26. The system of claim 19 wherein the operations further comprise conditioning acceptance of the potential password as the user's password upon comparison of a strength of the potential password against a threshold.

27. The system of claim 26 wherein conditioning acceptance of the potential password as the user's password upon comparison of the strength of the potential password against the threshold comprises denying selection of the potential password as the user's password in response to a determination that the strength of the potential password does not exceed the threshold.

\* \* \* \* \*